US012338675B2

(12) United States Patent
de Jong et al.

(10) Patent No.: US 12,338,675 B2
(45) Date of Patent: Jun. 24, 2025

(54) DOOR ARRANGEMENT

(71) Applicant: Royal Boon Edam International B.V., Edam (NL)

(72) Inventors: Mark de Jong, Edam (NL); Chris Weel, Edam (NL)

(73) Assignee: Royal Boon Edam International B.V., Edam (NL)

( * ) Notice: Subject to any disclaimer, the term of this patent is extended or adjusted under 35 U.S.C. 154(b) by 0 days.

(21) Appl. No.: 18/432,979

(22) Filed: Feb. 5, 2024

(65) Prior Publication Data

US 2024/0175312 A1 May 30, 2024

Related U.S. Application Data

(63) Continuation of application No. PCT/NL2022/050445, filed on Jul. 27, 2022.

(30) Foreign Application Priority Data

Aug. 3, 2021 (NL) .................................... 2028911

(51) Int. Cl.

| | |
|---|---|
| ***E06B 11/08*** | (2006.01) |
| ***E06B 3/36*** | (2006.01) |
| ***E06B 3/70*** | (2006.01) |

(52) U.S. Cl.

CPC ............ *E06B 11/085* (2013.01); *E06B 3/362* (2013.01); *E06B 3/7007* (2013.01)

(58) Field of Classification Search

CPC ....... E05D 15/54; E06B 3/7007; E06B 11/085
USPC ...................................................... D25/48.5
See application file for complete search history.

(56) References Cited

U.S. PATENT DOCUMENTS

| | | | | |
|---|---|---|---|---|
| 3,004,682 A * | 10/1961 | Bertolini | B65D 90/008 | 220/817 |
| 4,290,230 A * | 9/1981 | t'Kint de Roodenbeke | E06B 11/085 | 49/141 |
| 6,526,694 B1 * | 3/2003 | Cosgrove | E05D 15/54 | 49/67 |
| 6,952,861 B2 * | 10/2005 | Ynosencio | E05D 3/12 | 16/382 |
| 7,895,791 B2 * | 3/2011 | Miller | G07C 9/10 | 49/31 |
| 8,997,401 B2 * | 4/2015 | Kowalczyk | E05F 15/603 | 49/326 |
| 9,199,788 B2 * | 12/2015 | Kochanowski | E05D 3/12 | |
| 9,243,449 B1 * | 1/2016 | Ziemkowski | E05G 5/003 | |
| 9,598,887 B2 * | 3/2017 | Reed | E05D 7/0009 | |
| 9,845,627 B2 * | 12/2017 | Loggen | E05D 11/1014 | |

(Continued)

FOREIGN PATENT DOCUMENTS

| | | | | |
|---|---|---|---|---|
| CN | 105672793 A * | 6/2016 | | |
| DE | 20305477 U1 * | 9/2004 | E06B 11/085 | |

(Continued)

*Primary Examiner* — Catherine A Kelly
(74) *Attorney, Agent, or Firm* — Peacock Law P.C.; Justin R. Muehlmeyer; Daniel J. Berenger-Russell

(57) ABSTRACT

A door arrangement including a door frame profile that defines an opening in a passageway. The door arrangement includes at least one door which is openable in opposite directions of the passageway, and which at least one door is suspended with one or more hinges from the door frame profile. The one or more hinges are mounted on the door frame profile outside the opening in the passageway.

2 Claims, 2 Drawing Sheets

(56) References Cited

U.S. PATENT DOCUMENTS

| | | | | | |
|---|---|---|---|---|---|
| 11,319,049 | B2 * | 5/2022 | Smithson | B64C 1/1423 | |
| 11,649,676 | B2 * | 5/2023 | Gendig | E06B 11/085 | 49/358 |
| 11,976,699 | B2 * | 5/2024 | Huff | G08B 21/18 | |
| 12,030,638 | B2 * | 7/2024 | Rodriguez-Conde | E06B 3/7007 | |
| D1,039,716 | S * | 8/2024 | Weel | D25/48.5 | |
| 2010/0181882 | A1 * | 7/2010 | Lee | H05K 7/1488 | 49/402 |
| 2012/0297680 | A1 * | 11/2012 | Kuan | E05D 3/08 | 49/260 |
| 2018/0126830 | A1 * | 5/2018 | Lampsa | E05D 3/08 | |
| 2022/0268076 | A1 * | 8/2022 | Rauer | E06B 11/085 | |
| 2023/0358086 | A1 * | 11/2023 | Hall | E05D 7/081 | |

FOREIGN PATENT DOCUMENTS

| | | | | |
|---|---|---|---|---|
| EP | 0019020 | A1 * | 11/1980 | |
| EP | 0137568 | A2 | 4/1985 | |
| EP | 0688932 | A1 * | 12/1995 | |
| EP | 1059416 | A1 | 12/2000 | |
| EP | 1288430 | A2 * | 3/2003 | E05F 15/614 |
| GB | 1223662 | A | 3/1971 | |
| RU | 2572175 | C1 | 12/2015 | |
| WO | 2023014217 | A1 | 2/2023 | |

* cited by examiner

DOOR ARRANGEMENT

CROSS-REFERENCE TO RELATED APPLICATIONS

This application is a continuation of International Application No. PCT/NL2022/050445, entitled "A Door Arrangement", filed Jul. 27, 2022, which claims priority to Netherlands Patent Application No. 2028911, entitled "A Door Arrangement", filed Aug. 3, 2021, and the specifications and claims thereof are incorporated herein by reference.

BACKGROUND OF THE INVENTION

Field of the Invention

The invention relates to a door arrangement provided with a door frame profile that defines an opening in a passageway, and further provided with at least one door which is openable in opposite directions of the passageway, and which at least one door is suspended with one or more hinges from the door frame profile.

Background

Security gates are used at supermarkets or other facilities which are designed for high people traffic. With security gates, every centimeter counts when it comes to the available width of the passageway. Space is money. In addition, every centimeter saved on the use of space by the gate where the door arrangement is applied is also a long felt need with many applicants, including supermarkets. Particularly because of their desire to increase capacity, supermarkets strive to have a one-way flow of their customers, and the need therefore is only skyrocketing at nowadays times wherein Covid-19 is inflicting on everybody's life.

The invention intends to provide a solution for the above.

BRIEF SUMMARY OF THE INVENTION

Accordingly, the invention is embodied in a door arrangement having the features of one or more of the appended claims.

Embodiments of the present invention are directed to a door including one or more hinges mounted on the door frame profile outside the opening in the passageway. This provides the advantage that when the at least one door has been swung open, it can be positioned in the 'shade' of the door frame which provides a person passing the door arrangement a particular feeling of being welcome. This is very much favored in shops or supermarkets. Also, the chance of a shopping cart colliding with the at least one door, or even with the doorframe, is considerably reduced.

In another embodiment, the at least one door is provided with a body having first and second body portions that extend in two substantially orthogonal directions, and which first and second body portions merge into each other with a curved body portion which is intermediate between the first and second body portions, and which curved body portion is located at a shorter distance from the door frame profile than the distance of the curved body portion from a door edge which is distant from and parallel to the door frame profile.

In another embodiment, when the at least one door is opened in a first of the two opposite directions, the first and second body portion and the curved body portion are closely adjacent to a contour of the door frame profile, whereas when the at least one door is opened in a second of the two opposite directions, only the first body portion which is provided with the one or more hinges, is closely adjacent to the door frame profile, and the second body portion extends away from the door frame profile.

It is not essential that the door arrangement is only provided with a single door. The door arrangement may comprise two doors, the two doors being hinged on opposite posts of the door frame profile.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
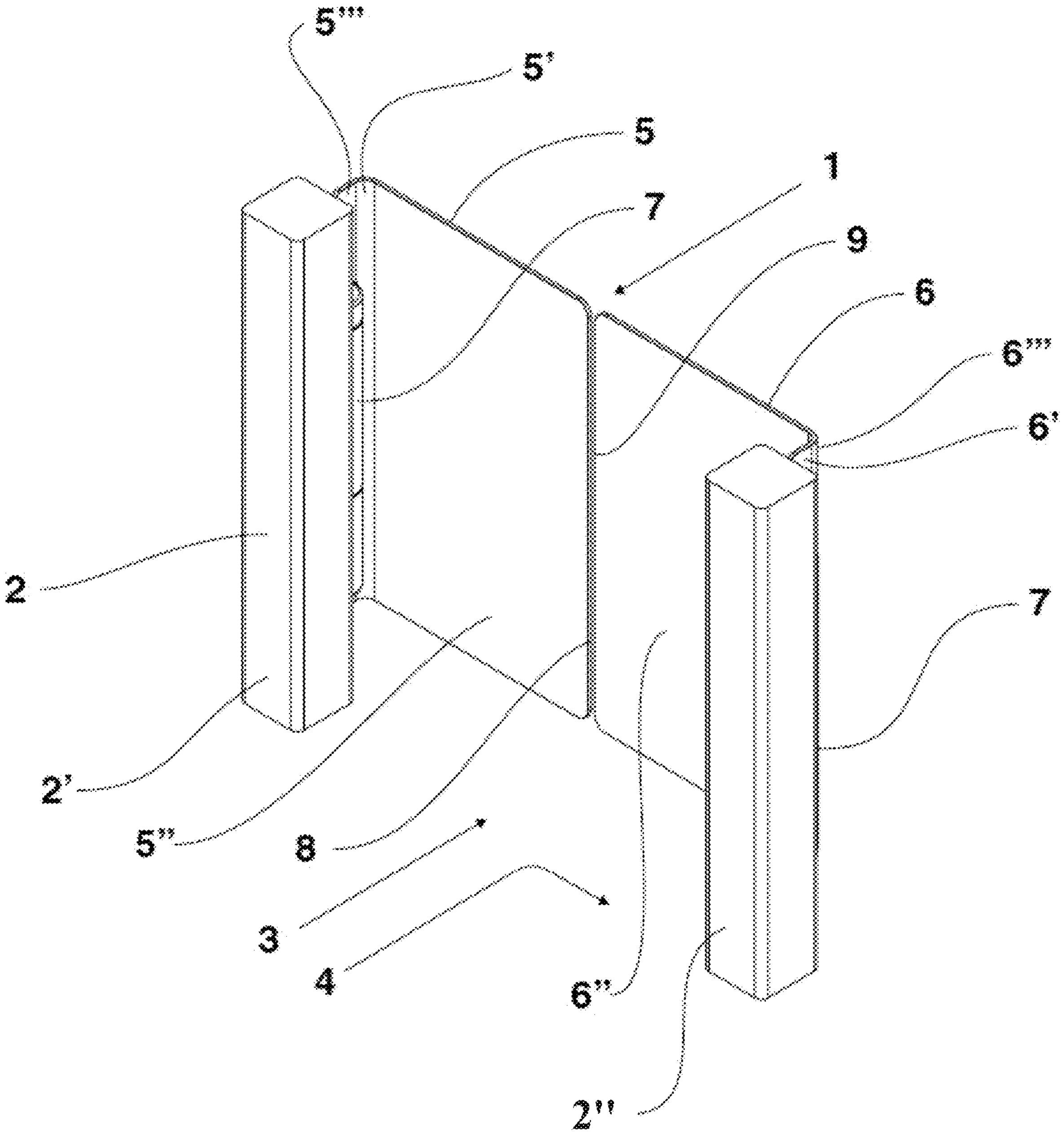
FIG. 1 is an illustration showing an isometric view of a door arrangement according to an embodiment of the present invention.

Whenever in the figures the same reference numerals are applied, these numerals refer to the same parts.

Figure 2:
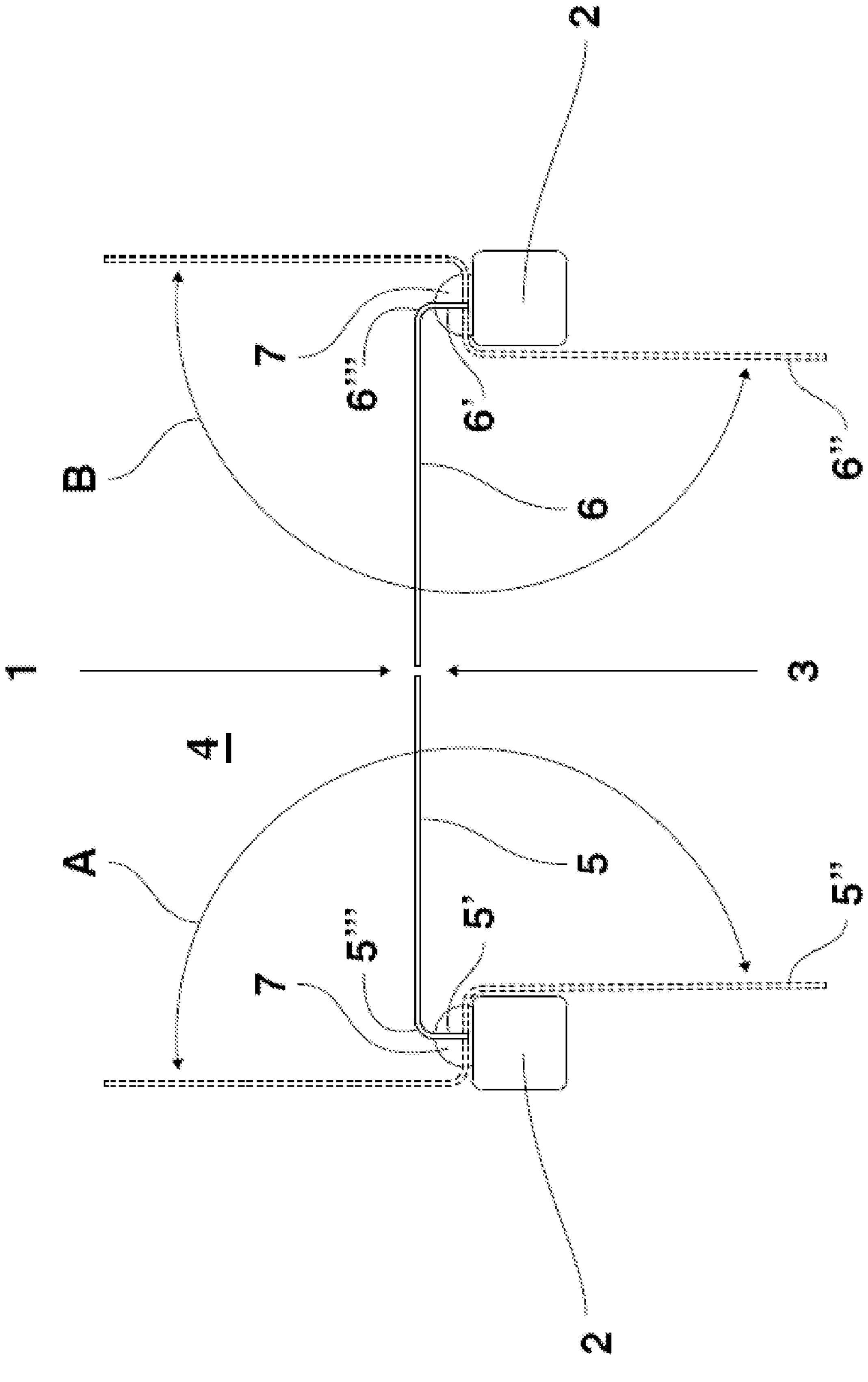
FIG. 2 is an illustration from a top view of a door arrangement according to an embodiment of the present invention.

With reference to both FIG. 1 and FIG. 2 a door arrangement 1 according to an embodiment of the present invention is shown. Door arrangement 1 comprises door frame profile 2 that defines opening 3 in passageway 4. Door arrangement 1 comprises at least one door. In the embodiment shown, there are two doors 5, 6, the two doors being hinged on opposite posts 2', 2" of door frame profile 2. Doors 5, 6 are openable in opposite directions of passageway 4, which is symbolized by arrows A and B in FIG. 2. Doors 5, 6 are each suspended with one or more hinges 7 from door frame profile 2, as depicted in FIG. 2. FIG. 2 further shows that one or more hinges 7 are mounted on door frame profile 2 outside opening 3 in passageway 4.

It will be clear from FIG. 1, and in particular from FIG. 2 that each of doors 5, 6 is provided with a body having first body portion 5', 6' and second body portion 5", 6" that extend in two substantially orthogonal directions, and which first and second body portions merge into each other with a curved body portion 5", 6" which is intermediate between first body portion 5', 6' and second body portion 5", 6", and which curved body portion 5", 6"" is located at a shorter distance from door frame profile 2 than the distance of curved body portion 5'", 6" from door edge 8, 9 which is distant from and parallel to door frame profile 2.

FIG. 2 shows doors 5, 6 in two possible positions, wherein door arrangement 1 is completely opened. It shows that when doors 5, 6 are opened in a first of the two opposite directions, first body portion 5', 6' and second body portion 5", 6" as well as curved body portion 5", 6" are closely adjacent to and follow a contour of door frame profile 2. This is the case when doors 5, 6 are opened in the direction as shown in the bottom part of FIG. 2. FIG. 2 further shows that when two doors 5, 6 are opened in a second of the two opposite directions as shown in the top part of FIG. 2, only first body portion 5', 6' which is provided with one or more hinges 7, is closely adjacent to door frame profile 2, whilst second body portion 5", 6" extends away from door frame profile 2.

Although the invention has been discussed in the foregoing with reference to an exemplary embodiment of the door arrangement of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another. The terms, "a", "an", "the", and "said" mean "one or more" unless context explicitly dictates otherwise.

What is claimed is:

1. A door arrangement comprising:

a door frame profile that defines an opening in a passageway through which high people traffic may travel;

at least one door which is openable in opposite directions of the passageway, the at least one door suspended with one or more hinges from the door frame profile, and the one or more hinges mounted on the door frame profile outside the opening in the passageway;

wherein the at least one door comprises a body having first and second body portions that extend in two substantially orthogonal directions, and the first and second body portions merge into each other with a curved body portion which is intermediate between the first and second body portions, and the curved body portion is located at a shorter distance from the door frame profile than a distance of the curved body portion from a door edge which is distant from and parallel to the door frame profile; and wherein when the at least one door is opened in a first of the two opposite directions, the first and second body portion and the curved body portion are closely adjacent to a contour of the door frame profile, and when the at least one door is opened in a second of the two opposite directions, only the first body portion which comprises the one or more hinges, is closely adjacent to the door frame profile, and the second body portion extends away from the door frame profile.

2. The door arrangement of claim 1, wherein the at least one door comprises two doors, the two doors being hinged on opposite posts of the door frame profile.

* * * * *